US008224684B2

(12) United States Patent
Hawn et al.

(10) Patent No.: US 8,224,684 B2
(45) Date of Patent: Jul. 17, 2012

(54) BEHAVIOR MAPPED INFLUENCE ANALYSIS TOOL

(75) Inventors: Mark K. Hawn, Atlanta, GA (US); Henry E. McIntosh, Atlanta, GA (US); Laurie Johnson, Potomac Falls, VA (US)

(73) Assignee: Accenture Global Services Limited, Dublin (IE)

( * ) Notice: Subject to any disclaimer, the term of this patent is extended or adjusted under 35 U.S.C. 154(b) by 446 days.

(21) Appl. No.: 12/478,546

(22) Filed: Jun. 4, 2009

(65) Prior Publication Data
US 2010/0185712 A1 Jul. 22, 2010

Related U.S. Application Data

(60) Provisional application No. 61/144,636, filed on Jan. 14, 2009.

(51) Int. Cl.
*G06F 10/00* (2006.01)
(52) U.S. Cl. ............... 705/7.29; 705/7.32; 705/7.36
(58) Field of Classification Search ............ 705/7.29, 705/7.32, 7.36
See application file for complete search history.

(56) References Cited

U.S. PATENT DOCUMENTS

| | | | | |
|---|---|---|---|---|
| 5,832,494 A * | 11/1998 | Egger et al. | ............ | 707/999.005 |
| 6,629,097 B1 * | 9/2003 | Keith | ................ | 1/1 |
| 7,840,604 B2 * | 11/2010 | Zhu et al. | ............. | 707/802 |
| 8,095,492 B2 * | 1/2012 | Cohen | ............... | 706/47 |
| 2003/0023685 A1 * | 1/2003 | Cousins et al. | ........... | 709/205 |
| 2003/0216942 A1 * | 11/2003 | Hawks | ............... | 705/2 |
| 2005/0075922 A1 * | 4/2005 | Brady et al. | ............. | 705/10 |
| 2007/0067210 A1 * | 3/2007 | Rishell et al. | ............. | 705/10 |
| 2007/0150302 A1 * | 6/2007 | McCall et al. | ............. | 705/1 |
| 2008/0183525 A1 * | 7/2008 | Tsuji et al. | ............. | 705/7 |
| 2008/0195451 A1 * | 8/2008 | Abram | ............... | 705/8 |
| 2008/0208644 A1 * | 8/2008 | Gray et al. | ............. | 705/7 |

OTHER PUBLICATIONS

"Stakeholder Analysis Process Guide" XYZ Project PowerPoint presentation from Accenture copyright 2003 from purao.ist.psu.edu/templates/a_stakeholderanalysisprocessguide-ath.ppt.*
Cross-Cutting Tool Stakeholder Analysis. Resources for Implementing the WWF Standards. Oct. 2005.*
Varvasovszky, Zsuzsa and Brugha, Ruairi. How to do (or not to do) . . . A stakeholder analysis. Health Policy and Planning; 15(3): 338-345. Oxford University Press 2000.*
Rizwan's Blog: a Practical Approach to Stakeholder Analysis. from http://consultingblogs.emc.com/rizwantayabali/archive/2006/10/12/A-Practical-Approach-to-Stakeholder-Analysis.*
Manktelow, Rachel. Stakeholder Management—winning support for your projects. From www.mindtools.com archived at http://web.archive.org/web/20030129092720 dated Jan. 29, 2003.*
Ramirez, Ricardo. Cultivating Peace. Conflict and Collaboration in Natural Resource Management. IDRC/World Bank 1999. Chapter 5: Stakeholder Analysis and conflict management.*

(Continued)

*Primary Examiner* — Johnna Loftis
(74) *Attorney, Agent, or Firm* — Brinks Hofer Gilson & Lione (57) ABSTRACT

An analysis tool guides the selection of an external agent who will interact with a selected organizational actor. The analysis tool helps to minimize mismatches in personality and behavior between the external agents and actors in the business. As a result, there are fewer misunderstandings about project scope and requirements, there is better communication between individuals, and valuable deals are more frequently closed.

20 Claims, 6 Drawing Sheets

OTHER PUBLICATIONS

Walker, Derek; Shelley, Arthur; and Bourne, Lynda. Influence, Stakeholder Mapping and Visualisation. From www.stakeholder-management.com copyright 2008.*

Fisch, Jill E. Measuring Efficiency in Corporate Law: The Role of Shareholder Primacy. Journal of Corporation Law v31n3 pp. 637-674 Spring 2006.*

Also known as: Social Network Analysis. Influence Mapping. from www.mindtools.com archived and accessed from web.archive.org Nov. 19, 2008.*

Brugha, Ruairi and Varvasovszky, Zsuzsa Stakeholder analysis: a review. Health Policy and Planning; 15(3):239-246. Oxford University Press 2000.*

Power Mapping: A Tool for Utilizing Networks, pp. 1-8, undated.

Eva Schiffer, The Power Mapping Tool: A Method for the Empirical Research of Power Relations, International Food Policy Research Institute, 33pgs., May 2007.

Social Style—The World's Best Personal Effectiveness Model, Tracom Group, 2pp., Dec. 2008.

The Four SOCIAL STYLEs$^{sm}$, Tracom Group, 2pp., Dec. 2008.

Power Mapping: A Tool for Utilizing Networks and Relationships, Center for International Media Action, 8pgs., http:www.idealist.org/ioc/learn/curriculum/pdf/PowerMapping.pdf., Feb. 22, 2005.

Hawn, M., U.S. Office Action, mailed Mar. 19, 2012, directed to related U.S. Appl. No. 12/686,160; 10 pages.

* cited by examiner

BEHAVIOR MAPPED INFLUENCE ANALYSIS TOOL

CROSS REFERENCE TO RELATED APPLICATIONS

This application takes the benefit of priority from U.S. Provisional Application Ser. No. 61/144,636, filed 14 Jan. 2009, which is incorporated by reference herein in its entirety.

BACKGROUND OF THE INVENTION

1. Technical Field

This disclosure relates to analyzing and leveraging the influence and behavior of actors within an organization, particularly as it relates to understanding, preparing for and influencing an organization's decision and selecting the most effective external agents to engage the actors.

2. Related Art

Modern organizations interact extensively with independent external agents. One example of such an external agent is a consulting company that assembles a deal team to work with the organization to propose, plan, and (ideally) win and implement a project. Regardless of the role that the external agents play, there is typically extensive interaction between many external agents and many actors from the organization. The interaction continues throughout the lifetime of a deal as the external agent and the organization work all aspects of the deal toward a mutually agreeable conclusion.

In the past, little guidance was available to help determine which deal team member or other external agent should interact with or build a relationship with specific actors in the organization and the best behavior that can help do that. Choosing the wrong external agent often led to an inability to effectively communicate with the right actors who influence other organizational actors in making decisions, misunderstandings about project scope and requirements, and, ultimately, failure to close and/or complete delivery of valuable deals. Therefore, a need exists to address the problems noted above and others previously experienced.

SUMMARY

An analysis tool helps determine which external agent should interact with which actor in the organization and understand which actor influences which actor and in what way. The analysis tool helps to understand and leverage the influence relationships that exist in the organization and to use that understanding to minimize mismatches in behavior between the external agents and the organizational actors. As a result, there are fewer misunderstandings about project scope and requirements, there is better communication between individuals, and valuable deals are more frequently closed and/or brought to a mutually agreeable conclusion.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The systems and methods may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION

Figure 1:
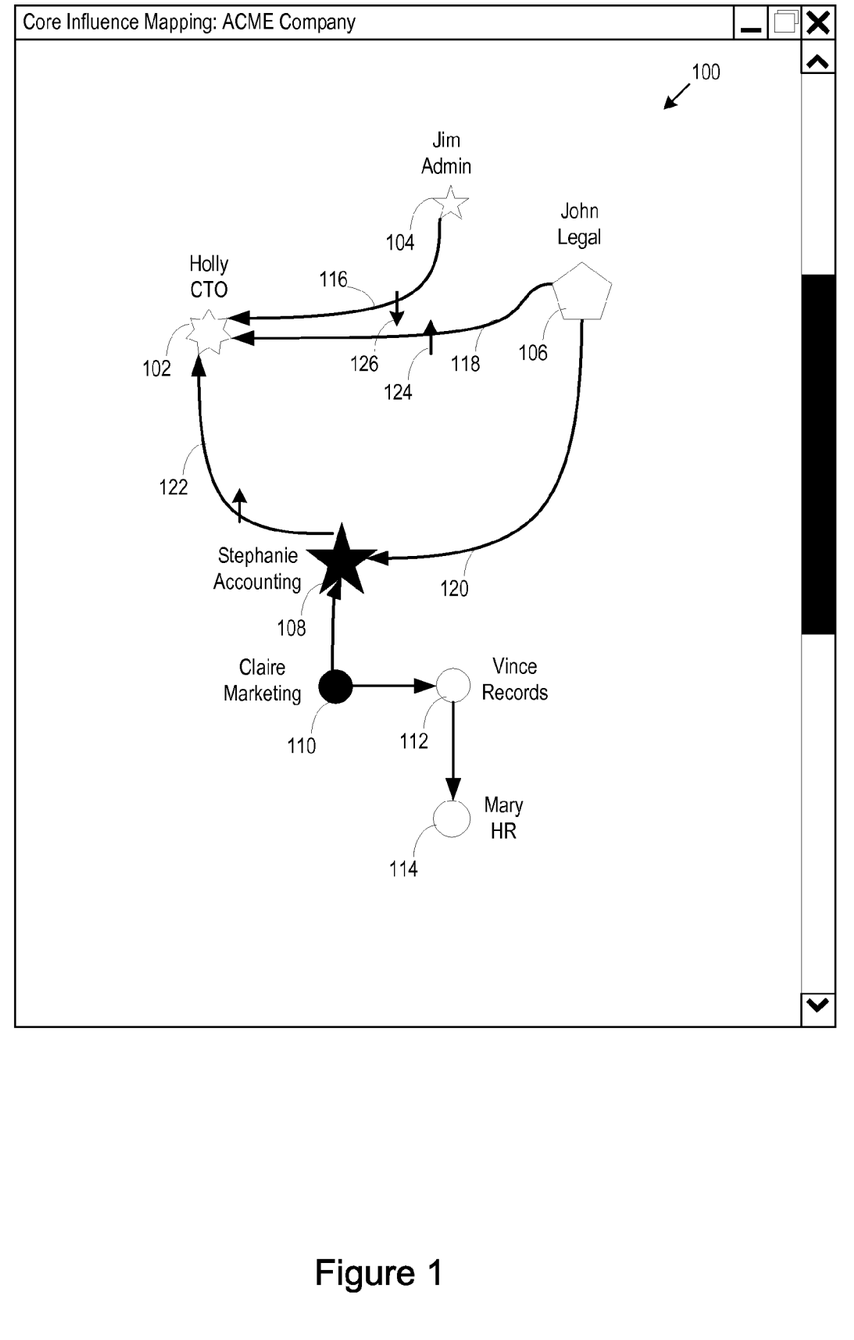
FIG. 1 shows a core influence mapping that helps to illustrate how organizational actors influence one another.

FIG. 1 shows a core influence mapping 100 that shows how organizational actors influence one another. In the example shown in FIG. 1, the core influence mapping 100 includes Holly as the chief technology officer (CTO) 102. The core influence mapping 100 also shows that within the organization, Jim works in an administrative position 104, John works in a legal position 106, and Stephanie works an accounting position 108. Furthermore, Claire works in a marketing position 110, Vince works in the records department 112, and Mary works in the human resources (HR) Department 114.

The individuals identified in FIG. 1 are examples of actors within an organization. The actors may assume virtually any role related to a specific deal, such as approver, recommender, or influencer, and may fill virtually any position in the organization, from chief executive officer to part-time project assistant. Symbols of various shapes, sizes, and designs may be used to distinguish between positions, importance, decision-making authority, or other characteristics of the roles of actors within the company.

The core influence mapping 100 further shows how the actors in the organization influence one another. More specifically, the core influence mapping 100 includes actor influence specifiers selectively connecting the actors to show how one actor influence as another, if at all. For example, the arc 116 shows that Jim directly influences Holly's decisions. FIG. 1 also shows that John has two paths of influence to Holly: first, directly to Holly as shown by the arc 118, and second, and indirectly to Holly through Stephanie, as shown by the arcs 120 and 122. Actor influence specifiers of various shapes, sizes, and designs may be used to distinguish various levels or strengths of influence between actors in the organization.

Figure 6:
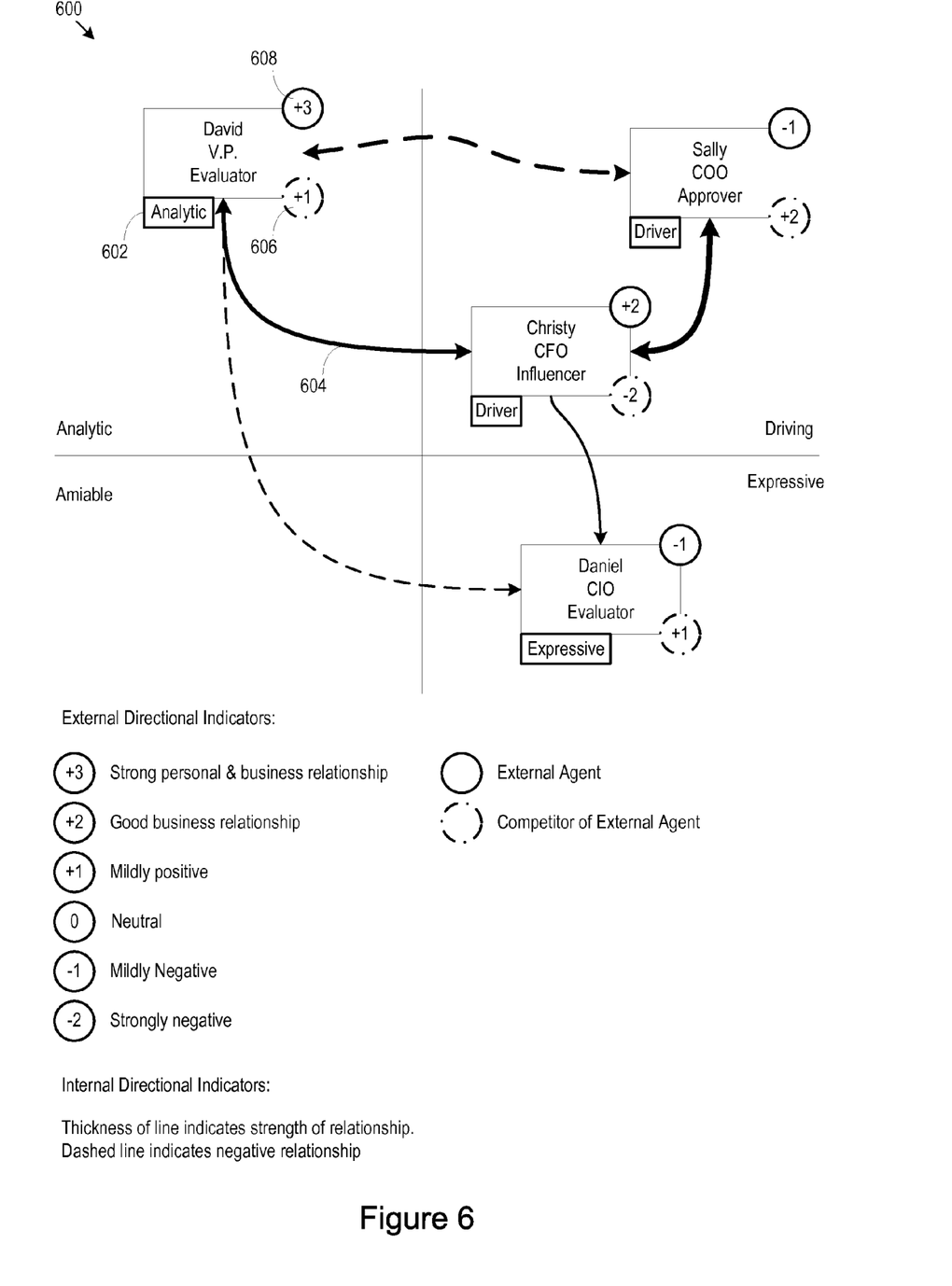
FIG. 6 shows a behavior influence mapping.

Additionally, directional indicators may be used to note if an influence is a positive, negative, or neutral influence. Negative influences may arise because, as examples, two people simply do not like each other, because an organizational actor does not like the external agent, or for other reasons. FIG. 1 shows an example of a positive internal directional indicator 124 and a negative internal directional indicator 126. The internal indicators illustrate positive, negative, or neutral influence between organizational actors. FIG. 6, described below, gives further examples, as well as examples of another type of directional indicator: an external directional indicator. The external directional indicator captures positive, negative, or neutral influence between organizational actors and an external agent (e.g., Consulting Corp. or Dave Smith of Consulting Corp.) or a competitor to the external agent. For example, Claire may have a positive relationship with Consulting Corp, making her a more attractive target to match with an external agent from Consulting Corp. for ultimately influencing Stephanie. The tool described below may take directional indicators into account when selecting a compatible external agent to interact with an organizational actor. It is noted that an external agent may not only refer to a company (e.g., Consulting Corp.), but also may refer to individuals (e.g., specific employees of Consulting Corp.) or other entities that may work with the organization.

Figure 2:
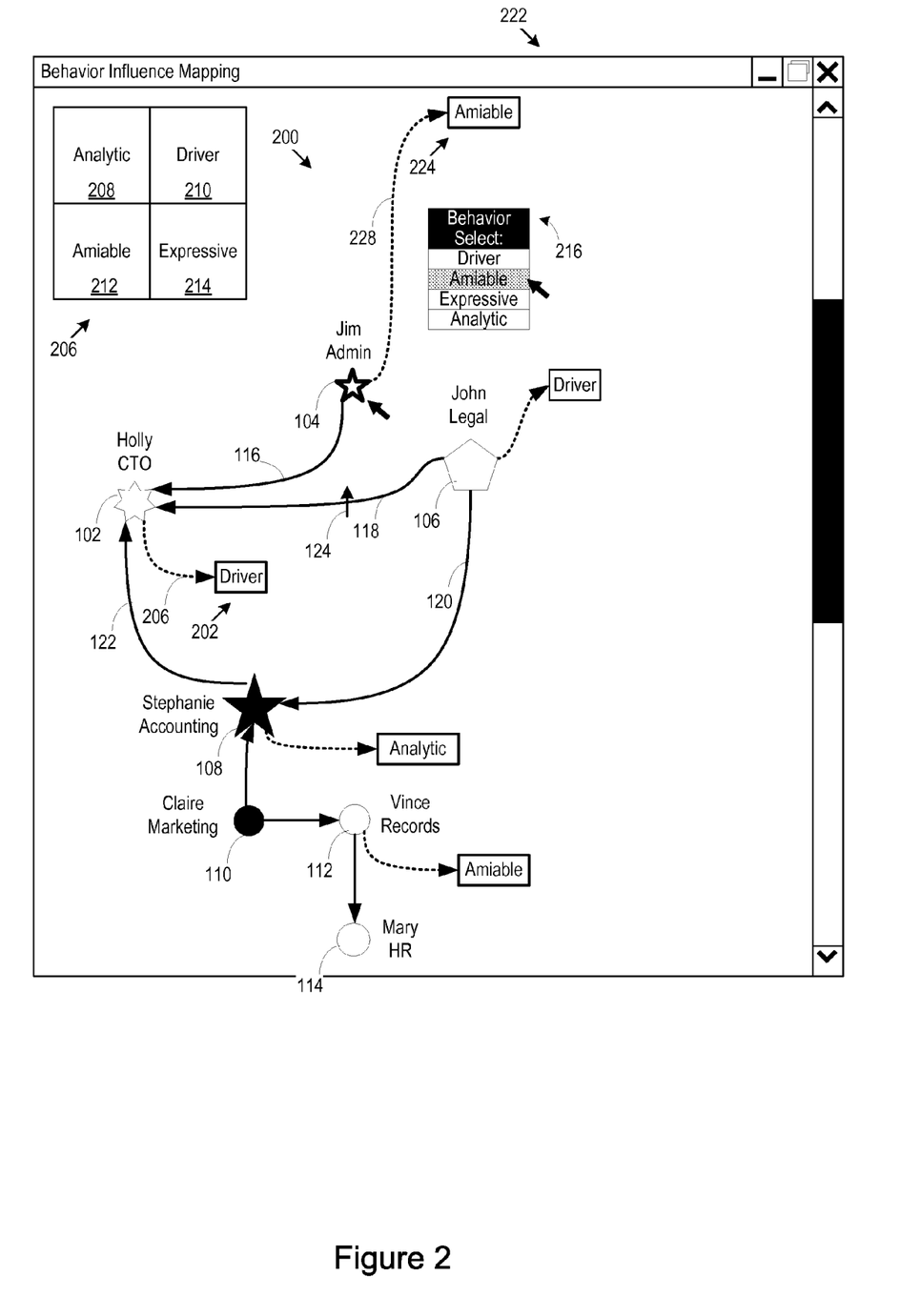
FIG. 2 shows a behavior influence mapping created by transforming the core influence mapping by adding actor behavior specifiers connected to the actors by behavior links.

The core influence mapping 100 helps to identify the actors within an organization and understand how the actors influence one another. The core influence mapping 100 may, of course, be adapted to map any selected organization and any selected actors within the selected organization. However, the core influence mapping 100 does not help determine which external agents should interact with the actors in the organization. Accordingly, the behavior mapped influence analysis tool ("tool"), described in more detail below, transforms the core influence mapping 100 into a behavior influence mapping 200 which does effectively assist with determining which external agents should interact with the organizational actors.

FIG. 2 shows a behavior influence mapping 200 that the tool creates by transforming the core influence mapping 100. More specifically, the tool adds actor behavior specifiers connected to the actors by behavior links. As one example, the behavior influence mapping 200 includes the behavior specifier 202 linked to Holly using the behavior link 206. The behavior specifier 202, in this example, specifies a 'Driver' behavior for Holly.

The behavior specifiers may indicate any predetermined selection of behavioral type. In one implementation, the permissible behavioral types are those present in the behavior model 206. The behavior model 206 includes an 'Analytic' behavior 208, which indicates fact driven and logical analysis; 'Driver' behavior 210, which indicates a result oriented practical approach to problems; 'Amiable' behavior 212, which indicates relationship oriented behavior; and 'Expressive' behavior 214, which indicates a spontaneous and impulsive type of behavior. The permissible behavior types may thereby be determined according to and follow the Social Style Model™ representation of behavior in the suite of products and services available from the TRACOM Group™ company. However, the behavior model 206 may instead employ any other framework for identifying behavior. An example of a suitable framework is a behavioral analysis framework that aids people to better understand and work with others, for example by identifying, classifying, or understanding decision-making and control needs and identifying the behavior that people exhibit when interacting with others.

The arrangement of behaviors in the behavior model 206 helps to reveal whether certain types of behaviors are suited to interacting with other types of behaviors. Often, opposite behaviors are not good matches for interaction. Thus, for example, a person exhibiting analytic behavior tends to be a poor match for someone exhibiting expressive behavior. However, individuals exhibiting the same behavior tend to be well matched and are preferential choices for building relationships. Finally, individuals with adjacent behaviors are typically able to interact in a productive or otherwise successful manner. Thus, for example, a first person exhibiting amiable behavior is typically able to successfully interact with a second person exhibiting analytic or expressive behavior. However, the determination to match people with adjacent behaviors may be a secondary or subordinate choice compared to matching people with the same behavior. Though there may be differences in behavior, versatility (described in detail below) can sometimes overcome those differences. In other words, versatile behavior diverse individuals can in many cases successfully work together.

The tool assists with the generation of the behavior influence mapping 200. To that end, the tool may initial generate a user interface 222 that initially displays a rendering of the core influence mapping 100. The tool may then accept operator input to tag any selected organizational actor with a behavior.

In the example shown in FIG. 2, the operator has provided a selection input (e.g., a mouse click, voice command, keystroke, or other input) specifying Jim as the selected actor to tag with behavior information. In response to the selection input, the behavior influence mapping tool displays a behavior list 216. The tool populates the behavior list 216 with the permissible behavior tags for the selected actor. The operator selects a permissible behavior tag for the selected actor from the behavior list 216. The list 216 may be a drop-down list, radio button set, text entry box, or any other type of selection or data entry mechanism.

Continuing the example, in response to operator behavior selections from the list 216, the tool has tagged Jim with 'Amiable' behavior by creating the behavior specifier 224. The behavior influence mapping tool also creates the behavior link 228 to connect Jim with the behavior specifier 224. The behavior links may be implemented in many different ways, such as a pointer from (or to) a record containing previously stored information (e.g., identifier and influence specifiers) about a selected actor to (or from) a record containing the behavior and versatility specifiers. As another example, the behavior link may be formed by storing behavior specifiers in a database record containing the previously stored information about the selected actor.

FIG. 6 shows a second example of a behavior influence mapping 600 that the tool may create by transforming a core influence mapping. The organizational actors in FIG. 6 are tagged with Name (e.g., David, Sally), Role in organization (e.g., Vice President, COO), and Role in project decision (e.g., Evaluator, Approver, Influencer). FIG. 6 shows, among others, a behavior specifier 602 of "Analytic" for David and a positive internal directional indicator 604 between David and Christy. FIG. 6 also shows an external directional indicator 606 for the external agent's competitor, and an external directional indicator 608 for the external agent (e.g., Consulting Corp.).

Thus, the mapping 600 tracks multiple types of influences that the tool may analyze when determining a compatible external agent to select for interaction with an organizational actor. Suppose, for example that Sally needs to be influenced because of her role as an Approver. Sally has a −1 external directional indicator toward the external agent and a +2 external directional indicator toward the external agent's competitor. Therefore, it may be difficult to directly influence Sally in favor of Consulting Corp. However, David has a +3 external directional indicator toward the external agent and a positive internal indicator toward Christy, who in turn can strongly influence Sally. Therefore, David may be a good choice for assignment to a specific compatible person from the external agent in an attempt to influence Sally, through Christy, in favor of the external agent.

In addition to determining a compatible external agent for any given organizational actor, the tool may also analyze the behavior influence mapping, including the external directional indicators, to assist in determining which organizational actor to target for a match to a given external agent. For example, the tool may first look for organizational actors to match who have the most positive external directional indicators, or the least negative competitor external directional indicators. The tool may further search the behavior influence mapping to find who has positive internal relationship paths to an ultimate decision maker that needs to be influenced (e.g., an organizational actor with an Approver role). Graph searching or other algorithms may perform this analysis, with the organizational actors and their roles forming nodes in the graph, and the internal directional indicators forming edges between nodes, with elements of the graph weighted by the strength of internal or external directional indicators.

With regard to determining compatibility with an external agent, the tool may increase or decrease compatibility in relation to increased or decreased external directional indicator strength for the external agent. The tool may further increase or decrease compatibility in relation to decreased or increased external directional indicator strength for the competitor. In other words, the tool may give preference to matches to those organizational actors who view the external agent most favorably, and/or who view the competitor least favorably. However, the tool may also match an external agent to an organizational actor who is not favorable toward the external agent. The tool may make such a match when it is important to focus on organizational actors who need to be persuaded, in contrast to those who already value the organization actor or their offer.

Figure 3:
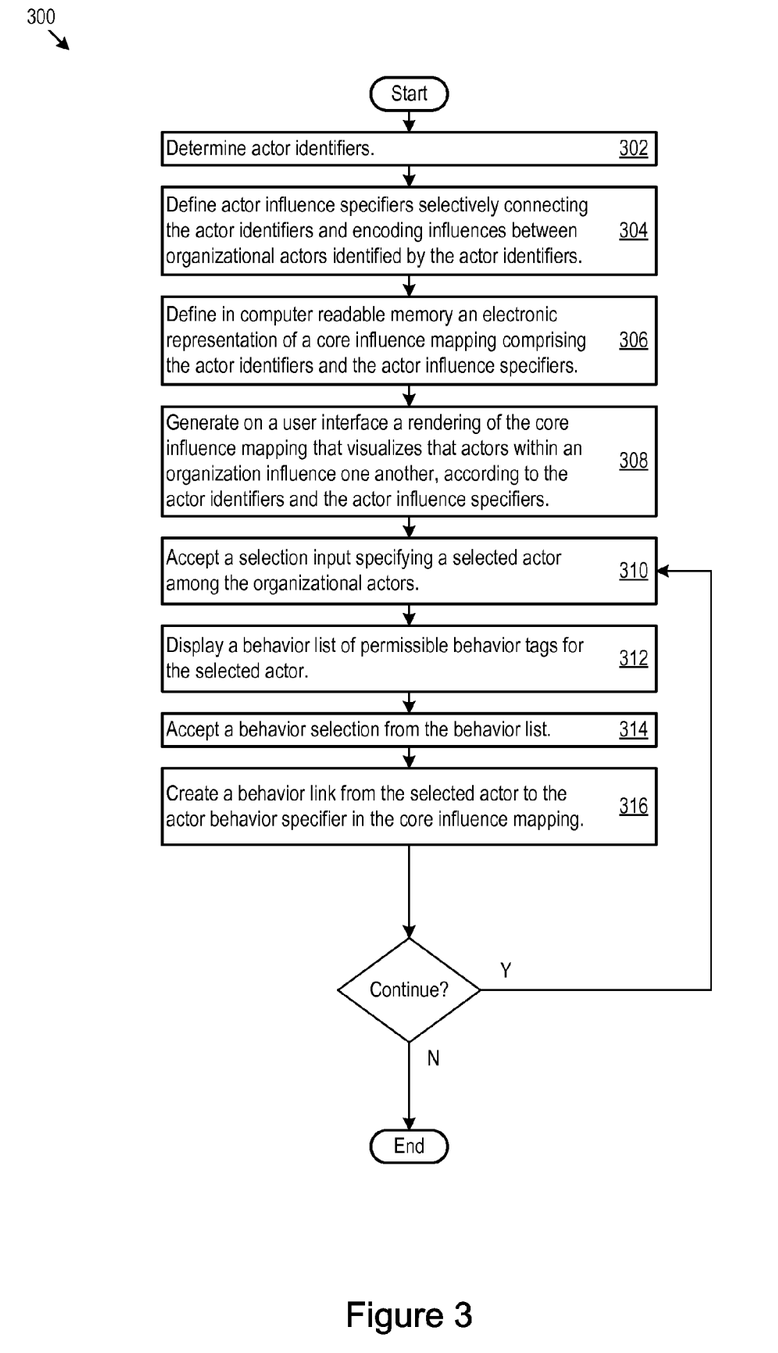
FIG. 3 shows logic that a mapping program may implement to visualize core influence mappings, accept actor behavior specifiers, and transform a core influence mapping into a behavior influence mapping.

FIG. 3 shows logic 300 that a mapping program in the tool may implement to visualize core influence mappings, accept actor behavior specifiers, and transform a core influence mapping into a behavior influence mapping. The mapping program defines or determines already selected actor identifiers (302). The actor identifiers may be, for example, unique numeric, alphabetic, or alphanumeric strings (e.g., "Holly—CTO") that specify individuals within an organization. The mapping program also defines or determines already established actor influence specifiers selectively connecting the actor identifiers and that encode influences between organizational actors identified by the actor identifiers (304). In FIG. 1, for example, the arc 116 is a type of actor influence specifier that shows that Jim influences Holly. The actor influence specifiers may take other forms, such as a list of actor identifiers, where each of the actor identifiers specifies an actor that a certain person can influence.

The mapping program also defines in computer readable memory an electronic representation of the core influence mapping (306). In other words, the mapping tool stores a representation of the core influence mapping 100 in memory. The data for the representation stored in memory may include the actor identifiers, the actor influence specifiers, or other data that encodes entities or relationships in the core influence mapping 100. The mapping program generates on a user interface a rendering of the core influence mapping 100 (308). As shown in FIG. 1, the core influence mapping 100 visualizes that actors within an organization influence one another, according to the actor identifiers and the actor influence specifiers.

The mapping program transforms the core influence mapping 100 into a behavior influence mapping 200 by tagging actors with behaviors. In that regard, the mapping program accepts a selection input specifying a selected actor among the organizational actors (310), displays a behavior list 216 of permissible behavior tags for the selected actor (312), and accepts a behavior selection from the behavior list 216 (314). The mapping program then creates an actor behavior specifier for the behavior selection in the core influence mapping 100. The mapping program creates a behavior link (e.g., 228) from the selected actor to the actor behavior specifier in the behavior influence mapping (316), thereby transforming the core influence mapping 100 into a behavior influence mapping 200.

The tool also helps to find suitable external agents to interact with actors within an organization. The tool may analyze the structure of the behavior model 206 as part of a compatibility analysis to determine external agents who would be compatible with any given organizational actor. One implementation of the compatibility analysis operates under the following analysis rules: 1) individuals exhibiting opposite behaviors (e.g., Analytic<->Expressive) should be rejected as matches; 2) individuals exhibiting the same behavior are preferred as highly compatible matches; and 3) individuals with adjacent behaviors (e.g., Amiable<->Expressive) are compatible, but less preferred than matches with the same behavior.

Examples of additional rules include: 4) if an external agent has a negative internal directional indicator for influence toward an organizational actor, then reject the external agent as a match, regardless of behavior; 5) if an external agent has a positive internal directional indicator for influence toward an organizational actor, then increase the determined level of compatibility between the external agent and the organizational actor (e.g., by increasing a compatibility score by a pre-determined amount); 6) increase the determined level of compatibility in relation to the strength of the external directional indicator for the external agent; and 7) decrease the level of compatibility in relation to the strength of the external directional indicator for the competitor of the external agent.

In some implementations, the tool considers versatility when determining which external agents are compatible with any selected organizational actor. Versatility may reflect ability or skillfulness in adapting to many different people in many different situations. Versatility is one indication that the external agent and the organizational actor may effectively build a relationship. Versatility may be measured by a versatility score or ranking, such as a numerical or alphabetic ranking. The versatility score for an external agent may be generated by analysis and processing of questions (e.g., behavioral analysis questions) given to, and answers given by, selected individuals who were chosen to answer the questions about the external agent. When the organizational actor is not among the selected individuals, the versatility score may not turn out to be absolutely correct with respect to the organizational actor, but the versatility score nevertheless may serve as a starting point for understanding versatility with respect to the organizational actor and as a reasonable basis for making compatibility decisions based in part on versatility. As one specific example, the versatility of an external agent may be scored in terms of how others see the eternal agent managing their tension level in the relationship on a four level scale from low versatility to high versatility.

Referring back to FIG. 2, Holly is a Driver. Assume that a first available external agent, Dan, is an Analytic, and that a second available external agent, Darren, is an Expressive. There is therefore already some level of compatibility between Holly and Dan and between Holly and Darren because their behaviors are adjacent in the behavior model 206. Assume also that Dan is versatile in terms of behavioral compatibility. The tool may take the versatility into consideration by increasing the assessed level of compatibility determined between Dan and Holly, or by making Dan a more preferred match than Darren.

Sufficient versatility may also reveal that otherwise behavior diverse individuals could be compatible and build relationships. Assume that Doug is an available external agent who is Amiable, opposite that of Holly. Ordinarily, the tool would indicate that Doug and Holly should not be matched. However, assume that Doug is versatile and that testing has determined a versatility score or level of 3. The versatility may make Doug a workable match. For example, if Doug's versatility score exceeded a matching threshold (e.g., level 3 versatility or above), then the tool may recommend matching Doug and Holly, but may further indicate that Doug is a less preferred match than Dan or Darren due to the fundamental opposing behavior of Doug and Holly.

The level of compatibility may be expressed in many different ways, both abstract (e.g., low, medium, high) and concrete (e.g., a numerical score). For example, a scoring model may assign an external agent with a matching behavior a compatibility score of 20, and may assign an external agent with an adjacent behavior a compatibility score of 10. The scoring model may also reward external agent versatility by increasing the compatibility score according to the strength of that versatility (e.g., level 1: increase 1 point, level 2: increase 4 points, level 3: increase 6 points, level 4: increase 8 points).

The scoring model may also assign a base compatibility score of 0 (zero) to an external agent with opposing behavior to a selected organizational actor. The tool may increase the base compatibility score as a function of the external agent versatility score (e.g., level 1: increase by 1, level 2: increase by 2, level 3: increase by 5, level 4: increase by 8). Thus, as the external agent exhibits greater versatility, the tool may further increase the compatibility score. The tool may cap the resulting compatibility score below the other scores explained above, to indicate that such a match is not preferred, but might be attempted in the right situations (e.g., no other external agent is available).

Figure 4:
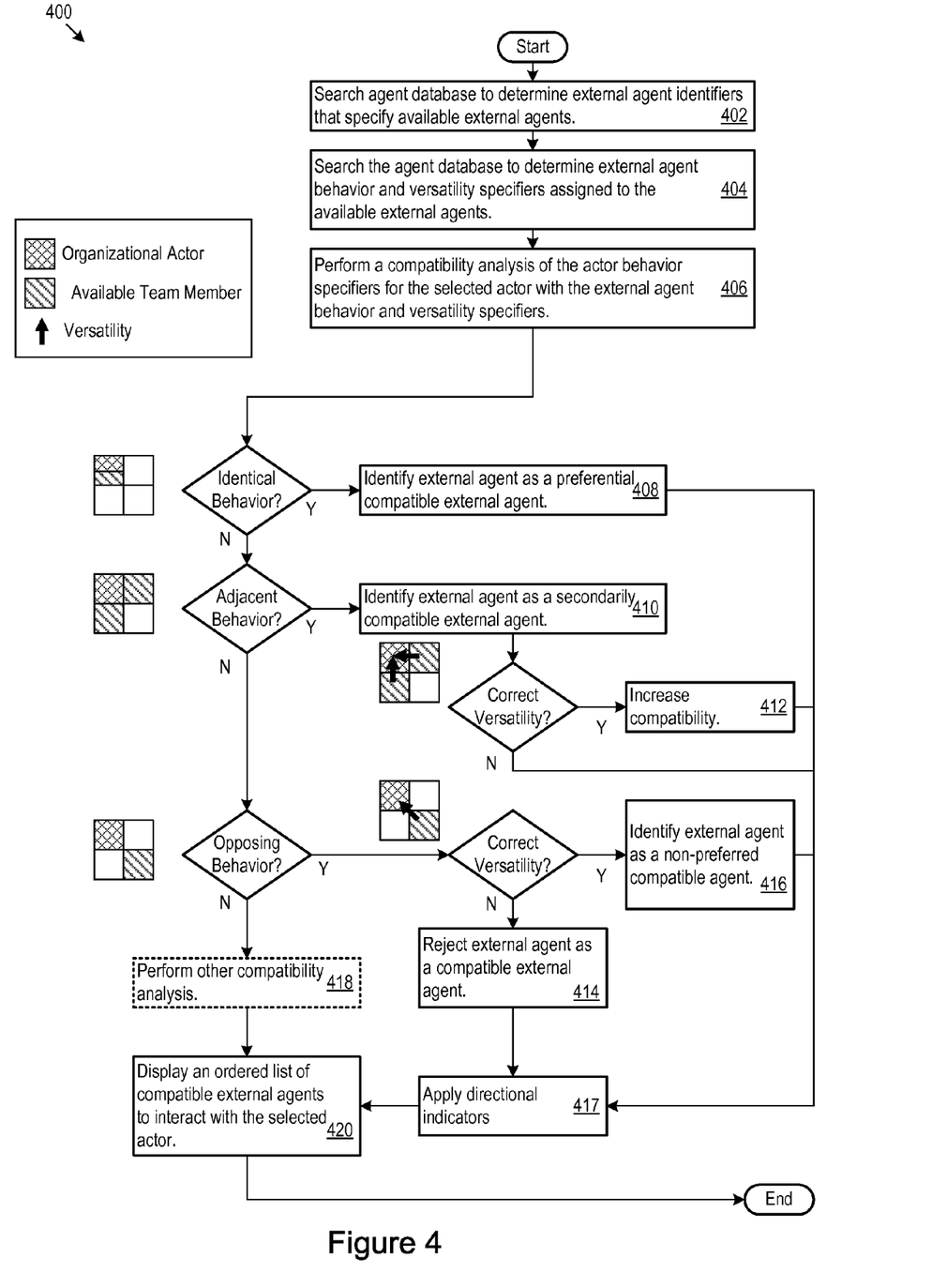
FIG. 4 shows logic that an agent search program may implement to identify compatible external agents to interact with organizational actors.

An agent search program executing in the tool may implement the compatibility analysis rules explained above. In particular, FIG. 4 shows logic 400 that the agent search program may implement to identify compatible external agents to interact with a selected organizational actor. The agent search program searches an agent database to determine external agent identifiers that specify available external agents (402). The agent search program also searches the agent database to determine external agent behavior and versatility specifiers assigned to the available external agents (404). The agent database may be preconfigured to include the agent identifiers, behaviors, and versatility specifiers for any particular external agents or specific deal teams of external agents assembled to work with any particular organization.

The agent search program initiates a compatibility analysis of the actor behavior specifier for the selected actor with the external agent member behavior and versatility specifiers (406). In particular, the agent search program determines whether any external agents have identical behavior compared with any selected actor in the organization. If so, the agent search program identifies the external agent as a preferred compatible external agent (408). As explained above, the agent search program may assign a compatibility score indicative of the level of compatibility found between the external agents and the selected actor.

Continuing the analysis, the agent search program may also determine whether any external agents have behavior that is adjacent to the behavior of the selected actor. If so, those external agents may be identified as secondarily compatible external agents (410). Furthermore, if either the external agent has versatility, then the agent search program may increase the level of compatibility found for the external agent and the selected actor (412).

It may also be the case that the external agent has opposing behavior to the selected actor. Opposing behavior may result in immediately rejecting the external agent as non-compatible (414). However, in some implementations of the tool, when the external agent has versatility, then the agent search program may identify the external agent as a compatible (though possibly non-preferred) selection to interact with the selected actor (416).

Furthermore, the agent search program may analyze external and internal influence directional indicators and apply them to the analysis of whether an external agent is compatible (417) (or which organizational actor to select to influence). For example, the agent search program may apply the analysis rules 4), 5), 6), and 7) noted above. Accordingly, even when an external agent has compatible behavior with respect to an organizational actor, the agent search program may nevertheless reject the external agent as a compatible external agent, when the direction of influence is negative or adverse between the external agent and the organizational actor. On the other hand, the agent search program may further increase the level of determined compatibility when the direction of influence is positive. As another example, the agent search program may attempt to match external agents to those organizational actors with the most positive external indicators, the least negative competitor external indicators, or any combination thereof.

The analysis described above is well suited for the behavior model 206. The behavior model 206 may be further subdivided into more finely grained behaviors. For example, each behavior may be subdivided into four sub-categories of behavior, determined by the underlying analysis factors gathered when the behavior analysis was performed. However, any other behavior analysis on any other behavior model 206 may be implemented and analyzed instead (418), and may give rise to additional, fewer, or different behavior compatibility rules.

Once the agent search program has completed the analysis, the agent search program may display a list (e.g., a score ranked list) of compatible external agents to interact with the selected actor (420). The compatibility scores assigned to the external agents may also be displayed with each compatible external agent. The agent search program may also display those external agents who were rejected as incompatible because of opposing behavior, unavailability, or for other reasons.

Figure 5:
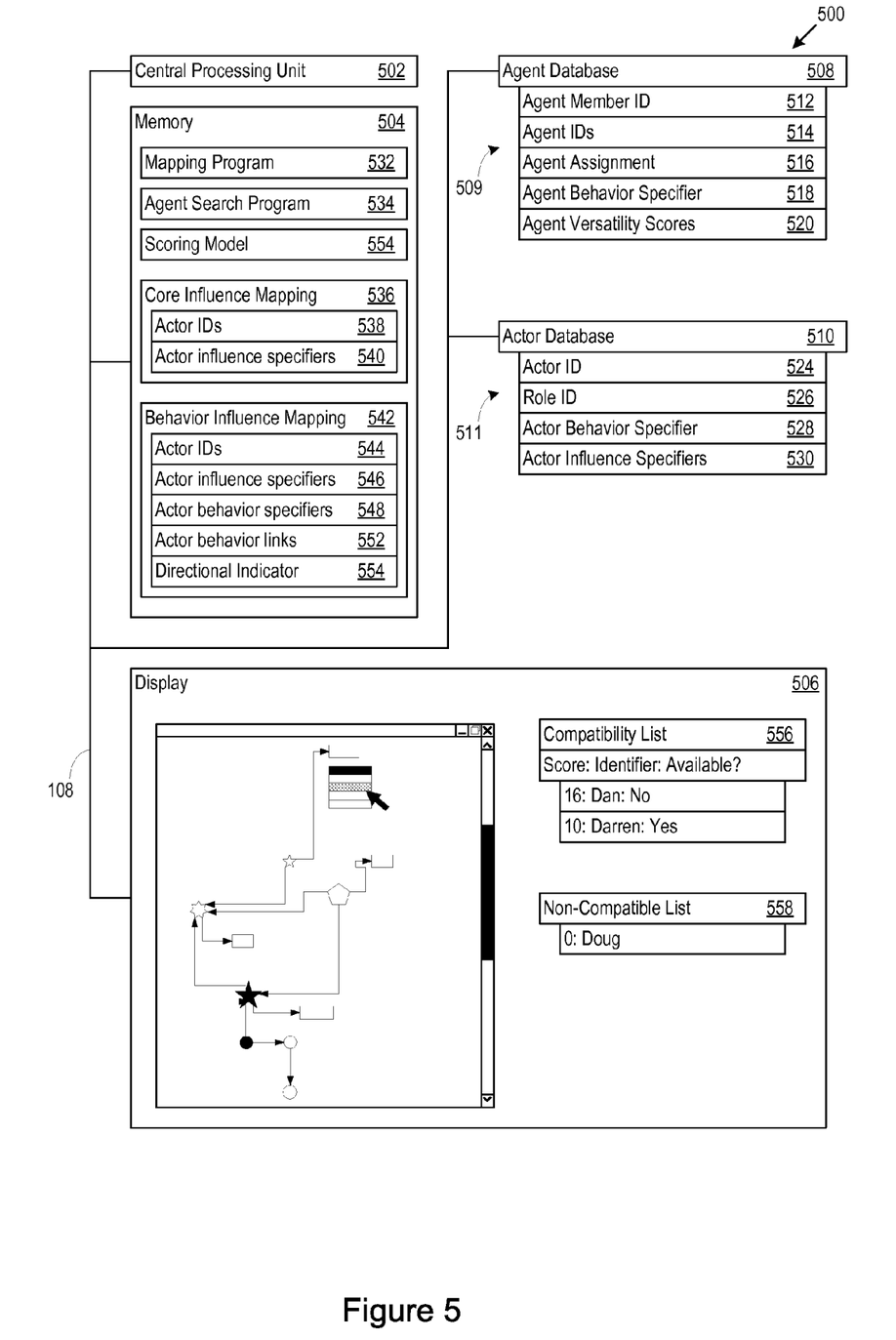
FIG. 5 shows a behavior mapped influence analysis tool.

FIG. 5 shows one example of a particular machine that implements a behavior mapped influence analysis tool 500 ("tool 500"). The tool 500 includes a processor 502, a memory 504, and a display 506. The tool 500 also includes a agent database 508 and an actor database 510. The agent database 508 stores sets of records that characterize the external agents. To that end, the agent database 508 may store an agent record 509 for each external agent including, as examples, the fields described below in Table 1.

TABLE 1

| Field | Description |
| --- | --- |
| Agent Member ID (512) | An identifier of the external agent, e.g., a name or employee number |

TABLE 1-continued

| Field | Description |
| --- | --- |
| Deal Team IDs (514) | An identifier of one or more specific deal teams that the external agent belongs to, e.g., ACME Company Network Consulting Deal |
| Agent Member Assignment (516) | An indicator of whether the external agent is available to be assigned, or is already assigned to another task |
| External Agent Behavior Specifier (518) | An identifier of the external agent's behavior, e.g., Analytic |
| External Agent Versatility Score (520) | The external agent's versatility score or level, e.g., 'level 3', 'Z', 'Strong', or 75 |

The actor database 510 stores sets of records that define the actors within the organization being targeted by the deal team. The actor database 510 may store an actor record 511 for each actor including, as examples, the fields described below in Table 2.

TABLE 2

| Field | Description |
| --- | --- |
| Actor ID (524) | An identifier of the organizational actor, e.g., a name or employee number |
| Role ID (526) | An identifier of the role played within the organization by the actor, e.g., CTO. |
| Actor Member Behavior Specifier (528) | An identifier of the actor's behavior, e.g., Amiable |
| Actor Influence Specifiers (530) | Specifiers of which other actors within the organization this actor can influence, e.g., Holly and Jim). |

The databases 508 and 510 may be implemented in many different ways and may include additional, fewer, or different fields depending upon the particular design of the tool 500, the behavior model, and the rules for determining compatible behaviors.

The processor 502 executes the program instructions of the mapping program 532 and the agent search program 534. The program instructions of the agent search program 534 may implement the logic described with respect to FIG. 4. The agent search program 534 may follow any desired scoring model 554, such as the scoring model described above, to determine compatibility scores for external agents. The agent search program 534 may display compatible external agents and non-compatible external agents on the user interface.

FIG. 5 shows, for example, that the agent search program 534 has generated a compatibility list 556 on the display 506. The compatibility list 556 enumerates compatible external agents in a ranking ordered by compatibility score. The agent search program 534 may also show external agent availability, as determined by evaluation of the External Agent Assignment field 516. FIG. 5 also shows a non-compatibility list 558 displayed to highlight particular external agents (in this case Doug) who should not be selected to interact with the selected organization actor.

The program instructions of the mapping program 532 implement the logic described above with respect to FIG. 3. The mapping program 532 works to transform the core influence mapping representation 536 in the memory 504 into the behavior influence mapping representation 542. The core influence mapping representation 536 includes actor identifiers 538 and actor influence specifiers 540. The actor influence specifiers 540 selectively connect the actor identifiers 538 and encode influences between organizational actors identified by the actor identifiers 538. For example, associating the actor influence specifier 'Holly' with the actor identifier 'Jim' connects Jim to Holly and connotes that Jim can influence Holly.

As described above with reference to FIG. 3, the mapping program 532 generates on a user interface a rendering of the core influence mapping 100. The core influence mapping 100 visualizes that the organizational actors influence one another as encoded by the actor influence specifiers. The mapping program 532 also accepts through the user interface a selection input specifying a selected actor from among the organizational actors. In response, the mapping program 532 displays a behavior list 216 that enumerates permissible behavior tags for the selected actor. The operator chooses a behavior selection, which the mapping program 532 receives and processes.

The mapping program 532 transforms the core influence mapping 100 into the behavior influence mapping 200. More specifically, the mapping program 532 creates an actor behavior specifier 548 for the behavior selection and creates a behavior link 550 from the selected actor to the actor behavior specifier 548 in the core influence mapping. The behavior influence mapping representation 542 stores this information, as well as actor identifiers 544 and actor influence specifiers 546, obtained, for example, from the original core influence mapping representation 536.

Furthermore, the behavior influence mapping 542 may include directional indicators 554 for influence. For example, the directional indicators 554 may encode whether any one or more of the influence specifiers 546 is positive or negative. The agent search program may take the directional indicators 554 into consideration when determining compatible external agents, as noted above in the discussion with respect to FIG. 4.

The behavior mapped influence analysis tool may be implemented in any combination of hardware and software. For example, programs in software libraries may provide the functionality of the mapping program 532 and the agent search program 534. Such software libraries may include dynamic link libraries (DLLs), or other application programming interfaces (APIs). The programs may be stored on a computer readable medium, such as a CDROM, hard drive, floppy disk, flash memory, or other computer readable medium. The programs may also be encoded in a tangible signal of any duration that bears the logic as the signal propagates from a source to a destination.

Furthermore, it is noted that the tool carries out electronic transformation of data that may represent underlying physical objects. For example, the mapping program 532, by selectively creating actor behavior links 552 and actor behavior specifiers 548 effectively transforms physically prepared core influence mappings into behavior influence mappings. Part of the transformation includes adding behavior information to the core influence mapping and linking the behavior information to organizational actors.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A method for behavior mapped influence analysis, comprising:
   defining in computer readable memory an electronic representation of a core influence mapping, the representation of the core influence mapping comprising:
   actor identifiers; and
   actor influence specifiers selectively connecting the actor identifiers and encoding influences between organizational actors identified by the actor identifiers;
   executing in computer readable memory a mapping program comprising program instructions that cause a processor to:
      generate on a user interface a rendering of the core influence mapping that visualizes that the organizational actors influence one another as encoded by the actor influence specifiers;
      accept through the user interface a selection input specifying a selected actor from among the organizational actors;
      display a behavior list comprising permissible behavior tags for the selected actor;
      accept through the user interface a behavior selection from the behavior list; and
      transform the core influence mapping into a behavior influence mapping by:
         creating an actor behavior specifier for the behavior selection in the core influence mapping; and
         creating a behavior link from the selected actor to the actor behavior specifier in the core influence mapping.

2. The method of claim 1, further comprising:
   executing in computer readable memory an agent search program comprising program instructions that cause a processor to:
   search an agent database to determine agent member identifiers that specify available external agents;
   search the agent database to determine agent behavior specifiers assigned to the available external agents;
   perform a compatibility analysis of the actor behavior specifier for the selected actor with the agent behavior specifiers;
   identify a compatible external agent from among the available external agents to interact with the selected actor, responsive to the compatibility analysis; and
   display the compatible external agent on the user interface.

3. The method of claim 2, where the agent search program further comprises program instructions that cause the processor to:
   determine that a first particular external agent from among the available external agents has a first external agent behavior specifier identical to the actor behavior specifier; and
   preferentially identify the first particular external agent as the compatible external agent.

4. The method of claim 3, where the agent search program further comprises program instructions that cause the processor to:
   determine that a second particular external agent from among the available external agents has a second external agent behavior specifier that is adjacent to the actor behavior specifier; and
   secondarily identify the second particular external agent as the compatible external agent subordinate to the first particular external agent.

5. The method of claim 2, where the agent search program further comprises program instructions that cause the processor to:
   determine that a particular external agent from among the available external agents has an agent behavior specifier that opposes the actor behavior specifier; and
   reject the particular external agent as the compatible external agent.

6. The method of claim 2, where the agent search program further comprises program instructions that cause the processor to:
   search the agent database to determine agent versatility specifiers assigned to the available external agents;
   perform the compatibility analysis of the actor behavior specifier for the selected actor with the external agent behavior specifiers and the agent versatility specifiers; and
   identify the compatible external agent from among the available external agents to interact with the selected actor, responsive to the compatibility analysis.

7. The method of claim 6, where the agent search program further comprises program instructions that cause the processor to:
   determine that a first particular external agent from among the available external agents has a first agent behavior specifier that is not identical to the actor behavior specifier;
   determine that a second particular external agent from among the available external agents has a second agent behavior specifier that is not identical to the actor behavior specifier;
   determine that the second particular external agent has an agent versatility specifier indicating behavior flexibility for the selected actor; and
   preferentially identify the second particular external agent as the compatible external agent over the first particular external agent.

8. The method of claim 1, further comprising: defining in the computer readable memory a behavior model from which the mapping program determines the permissible behavior tags.

9. An article of manufacture comprising:
   a non-transitory machine readable medium; and
   an electronic representation of a core influence mapping stored on the machine readable medium, the representation of the core influence mapping comprising:
   actor identifiers; and
   actor influence specifiers selectively connecting the actor identifiers and encoding influences between organizational actors identified by the actor identifiers;
   a mapping program stored on the machine readable medium and comprising program instructions that cause a processor to:
   generate on a user interface a rendering of the core influence mapping that visualizes that the organizational actors influence one another as encoded by the actor influence specifiers;
   accept through the user interface a selection input specifying a selected actor from among the organizational actors;

display a behavior list comprising permissible behavior tags for the selected actor;
accept through the user interface a behavior selection from the behavior list; and
transform the core influence mapping into a behavior influence mapping by:
creating an actor behavior specifier for the behavior selection in the core influence mapping; and
creating a behavior link from the selected actor to the actor behavior specifier in the core influence mapping.

10. The article of manufacture of claim 9, further comprising:
a agent search program stored on the medium and comprising program instructions that cause a processor to:
search a agent database to determine agent identifiers that specify available external agents;
search the agent database to determine agent behavior specifiers assigned to the available external agents;
perform a compatibility analysis of the actor behavior specifier for the selected actor with the agent behavior specifiers;
identify a compatible external agent from among the available external agents to interact with the selected actor, responsive to the compatibility analysis; and
display the compatible external agent on the user interface.

11. The article of manufacture of claim 9, further comprising: a behavior model stored on the machine readable medium from which the mapping program determines the permissible behavior tags.

12. The article of manufacture of claim 10, where the agent search program further comprises program instructions that cause the processor to:
determine that a first particular external agent from among the available external agents has a first agent behavior specifier identical to the actor behavior specifier;
preferentially identify the first particular external agent as the compatible external agent.

13. The article of manufacture of claim 10, where the agent search program further comprises program instructions that cause the processor to:
search the agent database to determine agent versatility specifiers assigned to the available external agents;
perform the compatibility analysis of the actor behavior specifier for the selected actor with the agent behavior specifiers and the agent versatility specifiers; and
identify the compatible external agent from among the available external agents to interact with the selected actor, responsive to the compatibility analysis.

14. The article of manufacture of claim 13, where the agent search program further comprises program instructions that cause the processor to:
determine that a first particular external agent from among the available external agents has a first agent behavior specifier that is not identical to the actor behavior specifier;
determine that a second particular external agent from among the available external agents has a second agent behavior specifier that is not identical to the actor behavior specifier;
determine that the second particular external agent has an agent versatility specifier indicating behavior flexibility for the selected actor; and
preferentially identify the second particular external agent as the compatible external agent over the first particular external agent.

15. A behavior mapped influence analysis system comprising: a memory comprising:
an electronic representation of a core influence mapping, the representation of the core influence mapping comprising:
actor identifiers; and
actor influence specifiers selectively connecting the actor identifiers and encoding influences between organizational actors identified by the actor identifiers;
a mapping program comprising program instructions that cause a processor to:
generate on a user interface a rendering of the core influence mapping that visualizes that the organizational actors influence one another as encoded by the actor influence specifiers;
accept through the user interface a selection input specifying a selected actor from among the organizational actors;
display a behavior list comprising permissible behavior tags for the selected actor;
accept through the user interface a behavior selection from the behavior list; and
transform the core influence mapping into a behavior influence mapping by:
creating an actor behavior specifier for the behavior selection in the core influence mapping; and
creating a behavior link from the selected actor to the actor behavior specifier in the core influence mapping; and
a processor that executes the mapping program.

16. The system of claim 15, further comprising:
an agent database; and
an agent search program stored in the memory and comprising program instructions that cause the processor to:
search the agent database to determine agent identifiers that specify available external agents;
search the agent database to determine agent behavior specifiers assigned to the available external agents;
perform a compatibility analysis of the actor behavior specifier for the selected actor with the agent behavior specifiers;
identify a compatible external agent from among the available external agents to interact with the selected actor, responsive to the compatibility analysis; and
display the compatible external agent on the user interface;
where the processor also executes the agent search program.

17. The system of claim 15, further comprising: a behavior model stored in the memory from which the mapping program determines the permissible behavior tags.

18. The system of claim 16, where the agent search program further comprises program instructions that cause the processor to:
determine that a first particular external agent from among the available external agents has a first agent behavior specifier identical to the actor behavior specifier;

preferentially identify the first particular external agent as the compatible external agent.

19. The system of claim 16, where the agent search program further comprises program instructions that cause the processor to:
    search the agent database to determine agent versatility specifiers assigned to the available external agents;
    perform the compatibility analysis of the actor behavior specifier for the selected actor with the agent behavior specifiers and the agent versatility specifiers; and
    identify the compatible external agent from among the available external agents to interact with the selected actor, responsive to the compatibility analysis.

20. The system of claim 19, where the agent search program further comprises program instructions that cause the processor to:
    determine that a first particular external agent from among the available external agents has a first agent behavior specifier that is not identical to the actor behavior specifier;
    determine that a second particular external agent from among the available external agents has a second external agent behavior specifier that is not identical to the actor behavior specifier;
    determine that the second particular external agent has an agent versatility specifier indicating behavior flexibility for the selected actor; and
    preferentially identify the second particular external agent as the compatible external agent over the first particular external agent.

* * * * *